F. W. HILD.
MOTOR VEHICLE.
APPLICATION FILED OCT. 2, 1916.
1,256,558.
Patented Feb. 19, 1918.
3 SHEETS—SHEET 1.
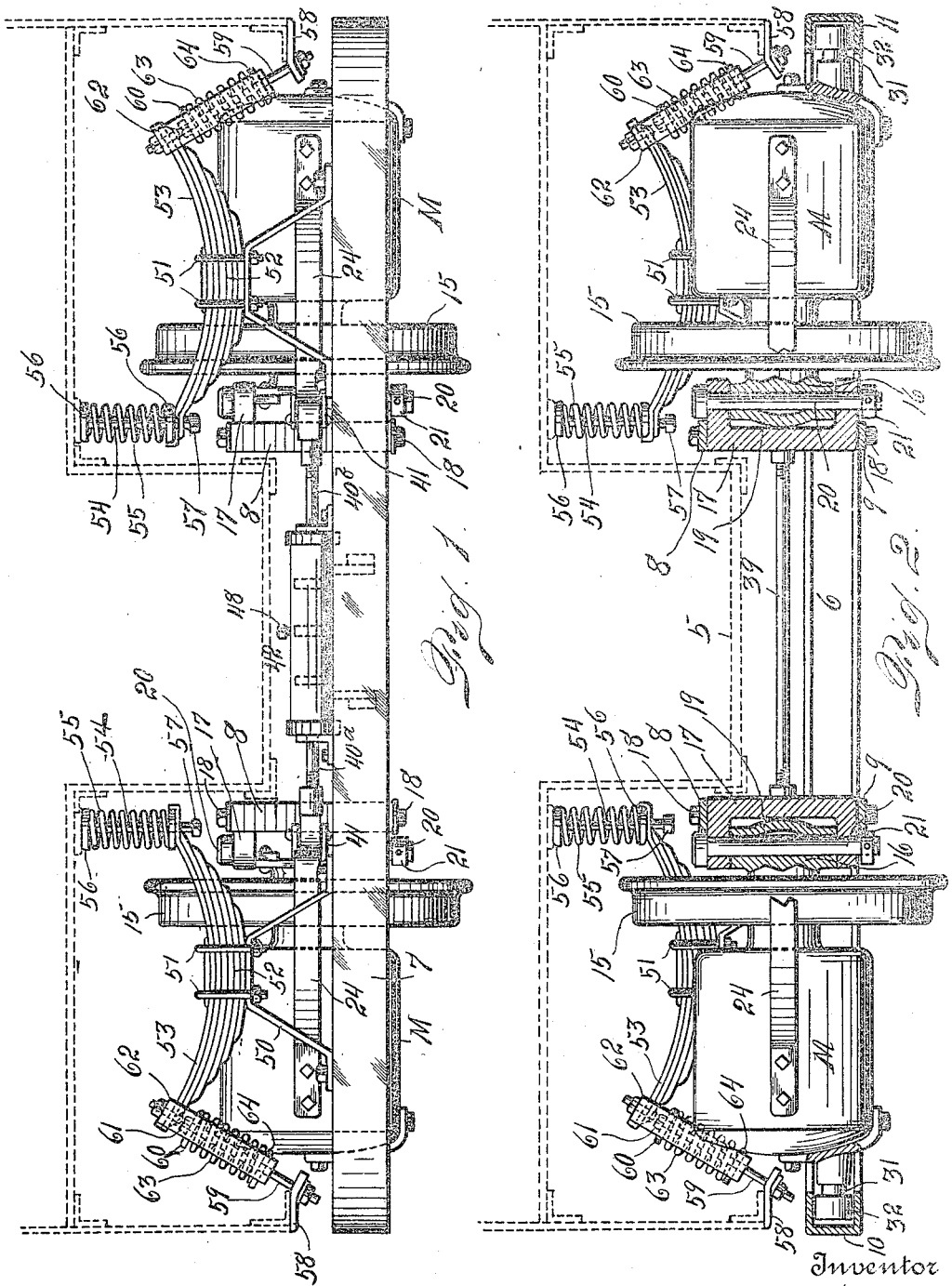
Inventor
Frederic W. Hild.

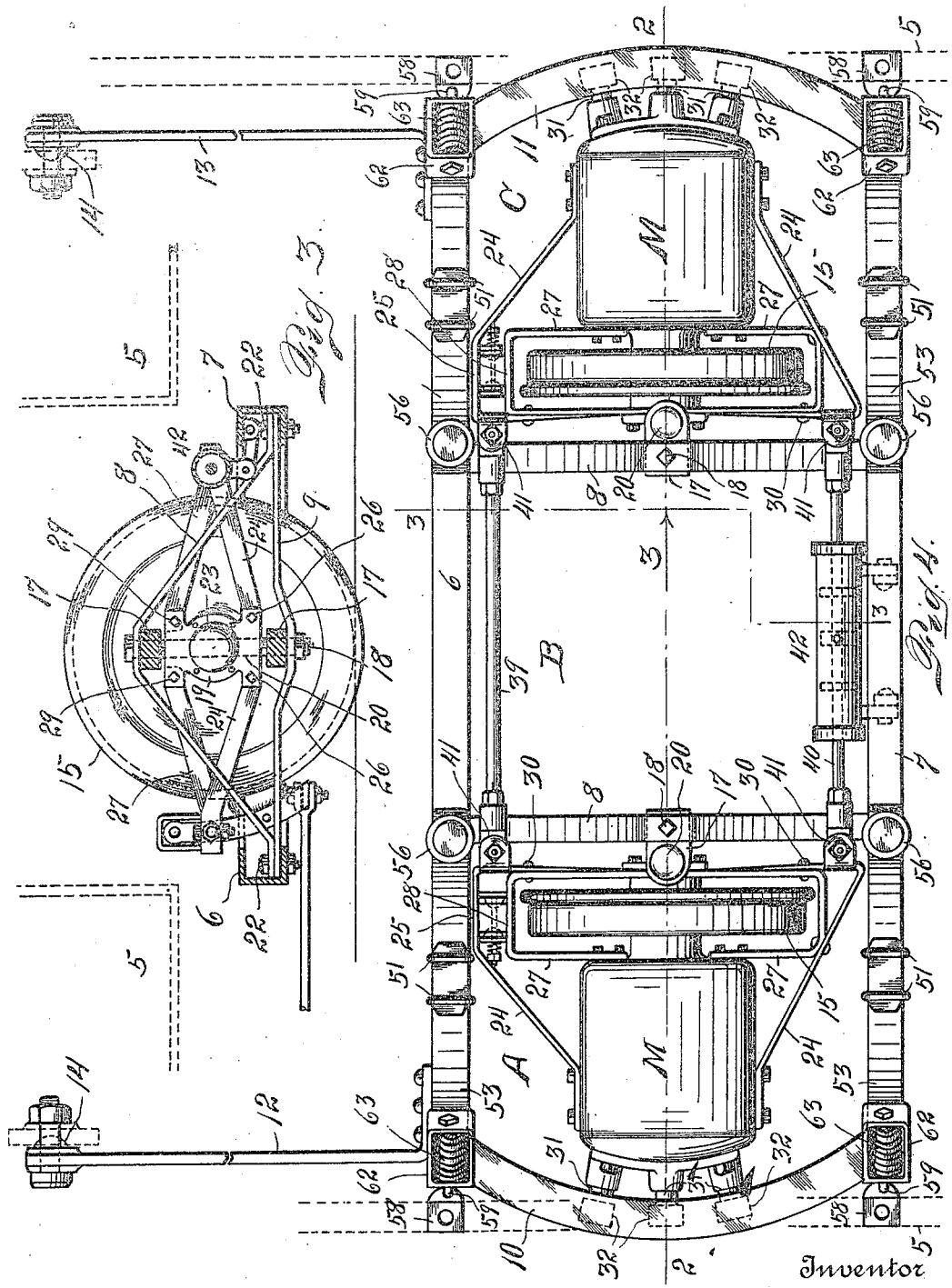

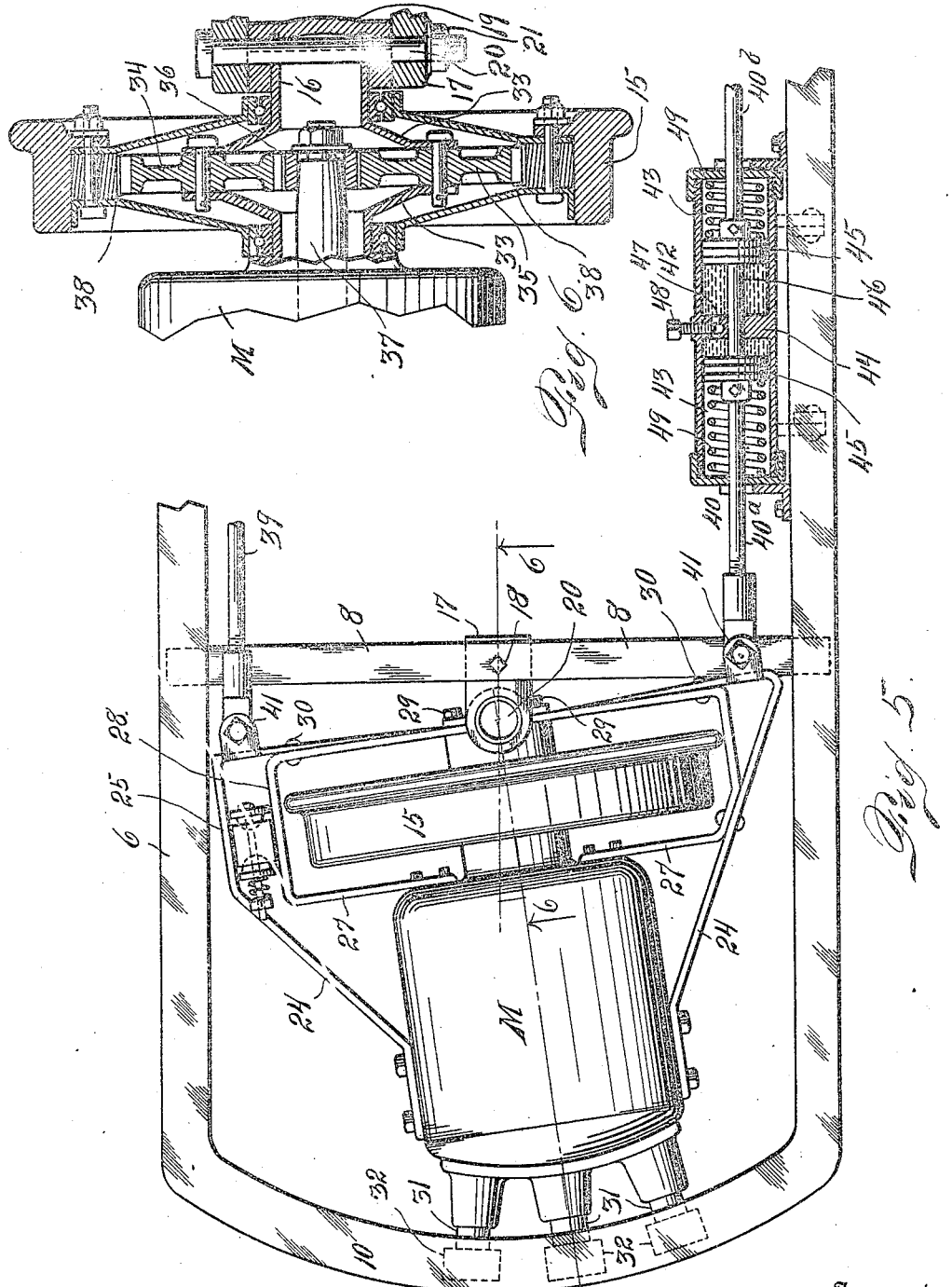

UNITED STATES PATENT OFFICE.

FREDERIC W. HILD, OF DENVER, COLORADO.

MOTOR-VEHICLE.

1,256,558.  Specification of Letters Patent.   Patented Feb. 19, 1918.

Application filed October 2, 1916. Serial No. 123,397.

*To all whom it may concern:*

Be it known that I, FREDERIC W. HILD, a citizen of the United States, residing at the city and county of Denver and State of Colorado, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the characters of reference marked thereon, which form a part of this specification.

The present invention relates to improvements in conveyances and pertains more particularly to vehicles adapted for use in passenger service. More especially the invention relates to certain improvements in various features of construction including novel mountings for the wheel trucks, wheels, and motors.

One of the principal objects of the invention is to provide an arrangement by which the wheels of the vehicle are each connected and driven by a motor carried at the outside of the wheel.

The invention also consists of the provision of improved features of construction whereby the several wheels are carried on individual axles and each provided with a separate motor. The invention further contemplates an improved manner of mounting the wheels so as to permit them to swing when rounding a curve through greater arcs than have heretofore been practicable. By provision of the special forms of wheel mountings herein set forth the position of the car body relative to the ground is materially lowered which results in a greater economy of space than is possible with the higher body constructions now in general use.

A further object of the invention consists in providing an improved type of supporting springs to insure a more perfect equalization and distribution of the load. The provision and arrangement of the supporting springs are such that the usual tendency of the vehicle body to rock from side to side is practically overcome and a perfect balance is established.

According to the present improvements, transverse wheel trucks are provided for the wheels each adapted to support a pair of wheels independently mounted and driven. Extensions are provided parallel to the truck frame ends being rigidly attached thereto, with their outer extremities journaled in brackets on the body frame. Thus the tractive and braking efforts of the motors and wheels are transmitted to the conveyance body at a point remote from the truck.

With these and other objects in view the invention consists in the combination and arrangement of parts more fully set forth in the following specification, illustrated in the accompanying drawings and pointed out in the appended claims.

In the drawings:—

Figure 1 is a front elevational view of the present invention, a portion of a car body or frame being shown in dotted lines.

Fig. 2 is a transverse section taken on the line 2—2 of Fig. 4, parts being shown in elevation.

Fig. 3 is a vertical section taken on the line 3—3 of Fig. 4, the wheel appearing in side elevation.

Fig. 4 is a top plan view of the invention.

Fig. 5 is a fragmental detail shown in top plan view of one end of the wheel frame drawn to an enlarged scale, illustrating the wheel and motor mountings, the dash pot appearing in section, and Fig. 6 is a vertical section taken on the line 6—6 of Fig. 5, looking in the direction of the arrows.

While the improvements comprising the present invention are primarily intended for application to electric street cars or tramways it will be understood that the novel features herein disclosed are not in any way limited to this particular use as they would be equally applicable to any form of passenger carrying vehicle whether it was adapted to run on railway tracks or on a street or road as is the case with a large automobile passenger truck, omnibus or the like. The invention is for convenience, illustrated and described as being embodied in the construction of an electric street car.

Referring now to the drawings the car body or frame structure 5 is indicated by dotted lines in the several views. A lower wheel frame or truck supports the car body and comprises a pair of parallel horizontally disposed channel bars 6 and 7 suitably spaced by intermediate pairs of cross bars 8 and 9 and connected at their ends by curved channel bars 10 and 11. The skeleton frame of the truck is thus of general rectangular shape divided into three adjacent sections A, B and C. Longitudinally disposed rods 12 and 13 extend from opposite ends of the bar 6 and are flexibly attached to some convenient part of the car body as indicated by the swiveled connection 14.

The wheels 15 are pivotally supported within the end sections A and C each being suitably carried on a stub axle 16 whose inner ends are carried in mountings supported by the respective cross bars 8 and 9 and several wheels 15 with their corresponding motors M are similarly connected to the frame parts hence a detailed description of one will suffice for all. Considering the wheel 15 shown at the left hand side of the figures, a knuckle joint comprising a yoke member 17 is provided being secured to the bars 8 and 9 and its upper and lower extremities by means of a bolt 18 or the like passing through the parts. The wheel axle 16 extends within the yoke 17 and is fixedly attached to a knuckle piece 19 pivoted on a pin 20 which is provided at its lower extremity with any suitable securing device, such as the nut or cap 21. The upper bar 8 extends upwardly from either side of the wheel frame to form an inverted V-shaped bracket to the central part of which the top of the knuckle plate 17 is secured. The lower bar 9 is slightly offset near its central portion and engages the lower end of plate 17. The extremities of these two plates 8 and 9 are fastened together and secured at opposite sides of the truck or wheel frame by bolts and nuts 22 passing through the lower edges of the channel bars 6 and 7. The knuckle plate 19 has formed integral therewith a face plate 23 to which the ends of the motor supporting frame pieces are bolted. A pair of supporting strips or bars 24 are bolted to opposite sides of the motor M. These members extend outwardly on opposite sides of the wheel 15, one of said members extending for a distance 25 parallel with the channel bar 6, they are then bent inwardly until their ends extend in a plane at right angles to the wheel frame. These end portions incline downwardly and are bolted to the lower part of the face plate 23 by suitable bolts 26. A second pair of supporting strips 27 are bolted to the inner face of the motor at opposite points. These strips are provided with V-shaped portions 28 bent around the wheel 15. Their ends extend inwardly and upwardly in the same vertical plane as the ends of strips 24, and are bolted to the upper part of face plate 23 by means of bolts 29. Where the ends of strips 24 and strips 27 cross they are fastened together by bolts 30. The motor M is provided with a number of rearwardly extending stub shafts 31 carrying on their outer extremities anti-frictional rollers 32 adapted to engage and move in the curved end channel bar 10, as the motor swings with the wheel 15 about the knuckle joint 17. The wheel hub 16 is pivoted to swing about the pin 20 but is fixed against rotation. Within the body of the wheel 15 the hub 16 extends radially outwardly forming a pair of flanges 33 between which a pair of planetary gears 34 and 35 are journaled adapted to be driven by a pinion 36 on the end of the motor armature 37 and in turn to drive a rack 38 at the inner circumference of the wheel. The hub 16 is also an integral part of the motor casing. The form of reduction gearing used within the wheel 15 is of the old and well known type.

In order to provide for the two wheels 15 turning in unison as the car rounds a curve, connecting rods 39 and 40 are provided extending across the frame section B and having their ends respectively coupled to the forward portions of the supporting strips 24 by means of loose link connections 41. In order to give greater flexibility to the device and to provide for the necessary yielding of the parts should one of the wheels 15 come violently in contact with a brick or other obstruction on the track, one of these connecting rods 40 is made in two sections $40^a$ and $40^b$ having their inner ends operating within a dash pot 42. The dash pot 42 is divided centrally into two chambers 43 separated by a partition 44. A piston head 45 is provided in each chamber 43, the two being rigidly coupled by a rod 46 passing through a central aperture in the partition 44. To outer sides of the pistons the rod sections $40^a$ and $40^b$ respectively are linked. Oil or other suitable fluid is contained within the inner ends of the chambers 43 a port 47 being provided in the partition 44 to permit the passage of the fluid from one chamber to the other, said port being also provided with means for controlling the flow of liquid therethrough as shown at 48. Coiled springs 49 within the outer ends of the chambers 43 bear against the piston heads 45 and tend to hold them against sudden displacement. It will be readily seen that should one of the wheels be given a sudden jerk by coming in contact with an obstacle on the track, it would cause an immediate compression of the corresponding coiled spring and an increased flow of oil toward that chamber 23, thus gradually cushioning the shock. When the force of the blow is spent and under normal conditions, the compression of the oppositely disposed springs will cause an equalizing action of the parts, which, however, will permit of the necessary movement when the wheels swing around a curved piece of track.

The frame or car body as shown extends downwardly over the middle wheel frame section B and also downward at the outer ends of the sections A and C. Four inverted V-shaped supporting brackets 50 are bolted at suitable places on the upper surfaces of the channel bars 6 and 7 and to the upper end of each is secured, by clips 51, a heavy spring 52 comprising a plurality of upwardly bowed superimposed leaves 53. The inner end of each spring 52 is slidably secured to a depending rod or bolt 54 which latter is encircled by a heavy coiled spring 55 the ends of which are separated from the upper framework and spring respectively by interposed washers 56. The tension of the spring 55 is adjustable by means of nut 57 carried on the lower end of bolt 54.

The outer ends of spring 52 are connected with bracket plates 58 secured to the lowermost part of the vehicle frame. The connection between these parts each consists of a bolt 59 secured to the lower plates 58 and provided at its upper end with a washer 60 retained by means of a nut 61. An outer housing 62 of rectangular shape is secured to the outer end of spring 52 being perforated at its lower end and surrounding rod 59. Within this housing is provided a heavy coiled spring 63 adapted to abut at its lower end against a washer 64 and at its upper end against the washer 60, the spring being normally under slight tension.

It will be seen that as the weight of the load of the car body is pressed downwardly the springs 54 will be compressed and a downward pressure will be exerted thereby at the inner ends of leaf springs 52. At the same time the pressure of the load downwardly will cause the rods 59 secured to the lower plates 58 acting through washer 60 to compress the coiled spring 63 and thus a downward pressure will also be exerted at the outer ends of springs 52. This particular arrangement in which the weight of the load exerts a pulling action on one end of the springs 52 and the pushing action on the opposite ends of the same springs tends to provide a more flexible and equally balanced spring support than would otherwise be the case. The spring mountings are such that they are particularly well adapted for use on car bodies having a central portion extending downwardly between the wheels as is here shown.

By means of the separate pivotal mountings for the several wheels and the individual motors associated and adapted to turn with the wheels a freer action is obtained than could possibly result from a construction in which the wheels were connected by a rigid interposed axle. Not only does this arrangement provide a more flexible and efficient turning action of the several wheels but it also provides an additional space which can be advantageously employed for the purpose of providing a car body having its floor extending to a level near the surface of the ground.

An obvious modification of the feature of the invention pertaining to the mounting of the motors outside of the wheels would consist of an arrangement by which a single motor was suitably supported centrally of the car body and at the outside of the wheels, the said motor being connected by proper gearing to simultaneously drive the two wheels on the same side of the vehicle.

Having described my invention what I claim is:

1. The combination with the transverse wheel truck of a motor car, of a pair of wheels mounted thereon so as to swing independently of each other about vertical axes, and a separate motor for each wheel adapted to swing therewith, the said motors being supported at the outer sides of the corresponding wheels.

2. The combination with the wheel truck of a motor car, of a pair of wheels mounted thereon so as to swing independently of each other about vertical axes and flexible means connecting said wheels.

3. The combination with the transverse wheel truck of a motor car, of a pair of wheels mounted thereon so as to swing independently of each other about vertical axes and a pair of parallel rods flexibly connecting said wheels.

4. The combination with the transverse wheel truck of a motor car, of a pair of wheels mounted thereon so as to swing independently of each other about vertical axes, a pair of parallel rods flexibly connecting said wheels, one of said rods including shock absorbing means.

5. The combination with the wheel truck of a motor car, of a pair of wheels mounted thereon so as to swing independently about vertical axes, motors attached to the respective wheels and to the truck, said motors adapted to move in unison with the wheels.

6. The combination with the wheel truck of a motor car, of a pair of wheels, a motor mounted upon the truck and associated with each, pivotal connections between said wheels and the truck, and movable connections between the motors and the truck whereby the wheels with their associated motors are each capable of independent movement about a vertical axis.

7. A motor car comprising in combination a wheel truck frame, a pair of independently pivoted wheels mounted thereon, a car body and supporting springs therefor, said springs each having its opposite ends connected with said body from their upper and lower sides respectively.

8. A motor car comprising in combination a wheel truck frame, a pair of independently pivoted wheels mounted thereon, a car body and supporting springs therefor, said springs having their central portions connected with said truck and their ends connected with the car body so as to cause a downward pushing at one end of each spring and a downward pulling at the opposite end thereof.

9. The combination with the wheel truck of a motor car, of a pair of wheels, a motor mounted upon the truck and associated with each wheel, movable connections between the said wheels and the truck, and slidable connections between the motors and the truck, whereby the wheels with their associated motors are each capable of independent movement about a vertical axis.

In testimony whereof I affix my signature, in presence of two witnesses.

FREDERIC W. HILD.

Witnesses:
H. A. VILLEMAGNE,
C. E. PARSONS.